(12) United States Patent
Ravichandran et al.

(10) Patent No.: US 12,447,820 B2
(45) Date of Patent: Oct. 21, 2025

(54) VEHICULAR INTERIOR REARVIEW MIRROR ASSEMBLY WITH DRIVER MONITORING CAMERA AND DRIVER BREATH ANALYZER

(71) Applicant: Magna Mirrors Holding GmbH, Sailauf (DE)

(72) Inventors: Sethuraman Ravichandran, Aschaffenburg (DE); Peter Krebs, Moembris (DE)

(73) Assignee: Magna Mirrors Holding GmbH, Sailauf (DE)

( * ) Notice: Subject to any disclaimer, the term of this patent is extended or adjusted under 35 U.S.C. 154(b) by 193 days.

(21) Appl. No.: 18/353,165

(22) Filed: Jul. 17, 2023

(65) Prior Publication Data

US 2024/0017610 A1 Jan. 18, 2024

Related U.S. Application Data

(60) Provisional application No. 63/371,533, filed on Aug. 16, 2022, provisional application No. 63/368,672, filed on Jul. 18, 2022.

(51) Int. Cl.
*B60K 28/02* (2006.01)
*B60R 1/12* (2006.01)
*B60W 40/08* (2012.01)
*G06V 20/59* (2022.01)

(52) U.S. Cl.
CPC ............... *B60K 28/02* (2013.01); *B60R 1/12* (2013.01); *B60W 40/08* (2013.01); *G06V 20/597* (2022.01); *B60R 2001/1253* (2013.01); *B60W 2420/403* (2013.01); *B60W 2540/24* (2013.01)

(58) Field of Classification Search
CPC ........... B60K 28/02; B60W 40/08; B60R 1/12
See application file for complete search history.

(56) References Cited

U.S. PATENT DOCUMENTS

| | | |
|---|---|---|
| 7,914,187 B2 | 3/2011 | Higgins-Luthman et al. |
| 8,718,536 B2 | 5/2014 | Hannon |
| 9,405,120 B2 | 8/2016 | Graf et al. |
| 9,662,976 B2 | 5/2017 | Comeau et al. |
| 10,017,114 B2 | 7/2018 | Bongwald |
| 10,065,574 B2 | 9/2018 | Tiryaki |
| 10,205,819 B2 | 2/2019 | Hannon et al. |
| 10,839,233 B2 | 11/2020 | Lynam et al. |
| 10,958,830 B2 | 3/2021 | Koravadi |

(Continued)

*Primary Examiner* — Tan Q Nguyen
(74) *Attorney, Agent, or Firm* — HONIGMAN LLP

(57) ABSTRACT

A vehicular alcohol sensing system includes an air sensing device disposed at a vehicular component disposed at an interior portion of a vehicle. The air sensing device captures sensor data representative of a sample of air at the vehicular component. A driver monitoring camera is disposed in the vehicle and captures image data representative of at least a head region of a driver of the vehicle. The vehicular alcohol sensing system, based on processing by a data processor of sensor data captured by the air sensing device and based on processing by an image processor of image data captured by the driver monitoring camera, determines an alcohol level of the driver's breath. The vehicular alcohol sensing system, responsive to determining that the alcohol level of the driver's breath is above a threshold alcohol level, prevents operation of the vehicle.

26 Claims, 3 Drawing Sheets

(56) References Cited

U.S. PATENT DOCUMENTS

| | | |
|---|---|---|
| 11,518,401 B2 | 12/2022 | Kulkarni |
| 11,639,134 B1 | 5/2023 | Huizen et al. |
| 11,780,372 B2 | 10/2023 | Sobecki et al. |
| 11,827,153 B2 | 11/2023 | Miller et al. |
| 12,128,827 B2 | 10/2024 | Huizen et al. |
| 12,131,511 B2 | 10/2024 | Rother et al. |
| 12,134,358 B2 | 11/2024 | Baur |
| 2010/0012417 A1 | 1/2010 | Walter et al. |
| 2010/0251804 A1 | 10/2010 | Morley et al. |
| 2010/0294583 A1* | 11/2010 | Biondo .................. A61B 5/082 340/576 |
| 2012/0055726 A1 | 3/2012 | Hannon |
| 2012/0236136 A1* | 9/2012 | Boddy ................. B60K 28/066 340/576 |
| 2013/0338880 A1 | 12/2013 | Connerty et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2018/0222414 A1 | 8/2018 | Ihlenburg et al. |
| 2018/0231976 A1 | 8/2018 | Singh |
| 2018/0235581 A1 | 8/2018 | Vianello |
| 2019/0210615 A1 | 7/2019 | Caron et al. |
| 2020/0143560 A1 | 5/2020 | Lu et al. |
| 2020/0202151 A1 | 6/2020 | Wacquant |
| 2020/0320320 A1 | 10/2020 | Lynam |
| 2021/0291739 A1 | 9/2021 | Kasarla et al. |
| 2021/0323473 A1 | 10/2021 | Peterson et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2024/0042826 A1 | 2/2024 | Ravichandran et al. |
| 2024/0415408 A1* | 12/2024 | Paknahad ............ A61B 5/6893 |

* cited by examiner

VEHICULAR INTERIOR REARVIEW MIRROR ASSEMBLY WITH DRIVER MONITORING CAMERA AND DRIVER BREATH ANALYZER

CROSS REFERENCE TO RELATED APPLICATIONS

The present application claims the filing benefits of U.S. provisional application 63/371,533, filed Aug. 16, 2022, and U.S. provisional application Ser. No. 63/368,672, filed Jul. 18, 2022, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is known to provide a shutoff device that precludes starting of a vehicle if the driver fails a breathalyzer test via a testing device connected to the ignition of the vehicle, where the driver provides a breath sample at a mouthpiece connected to a breath tube and the breath tube carries the sample from the mouthpiece to the testing device.

SUMMARY OF THE INVENTION

A vehicular alcohol sensing system includes an air sensing device disposed at a vehicular component at an interior portion of a vehicle equipped with the alcohol sensing system. For example, the vehicular component may be an interior rearview mirror assembly or an overhead console module or a windshield electronics module or the like. The air sensing device captures sensor data representative of a sample of air at the vehicular component. A driver monitoring camera captures image data representative of at least a head region of a driver of the vehicle. For example, the driver monitoring camera may be disposed at the interior rearview mirror assembly and view through the mirror reflective element of the mirror assembly. An electronic control unit (ECU) includes electronic circuitry and associated software, with the electronic circuitry including a data processor for processing sensor data captured by the air sensing device and an image processor for processing image data captured by the driver monitoring camera. The system, based on processing at the ECU of sensor data captured by the air sensing device and processing at the ECU of image data captured by the driver monitoring camera, determines an alcohol level of the driver's breath. Responsive to determining that the alcohol level of the driver's breath is above a threshold level, the system prevents the driver from operating the vehicle (such as by shutting off the vehicle, disabling the ignition of the vehicle, or the like).

These and other objects, advantages, purposes and features of the present invention will become apparent upon review of the following specification in conjunction with the drawings.

DESCRIPTION OF THE PREFERRED EMBODIMENTS

Figure 1:
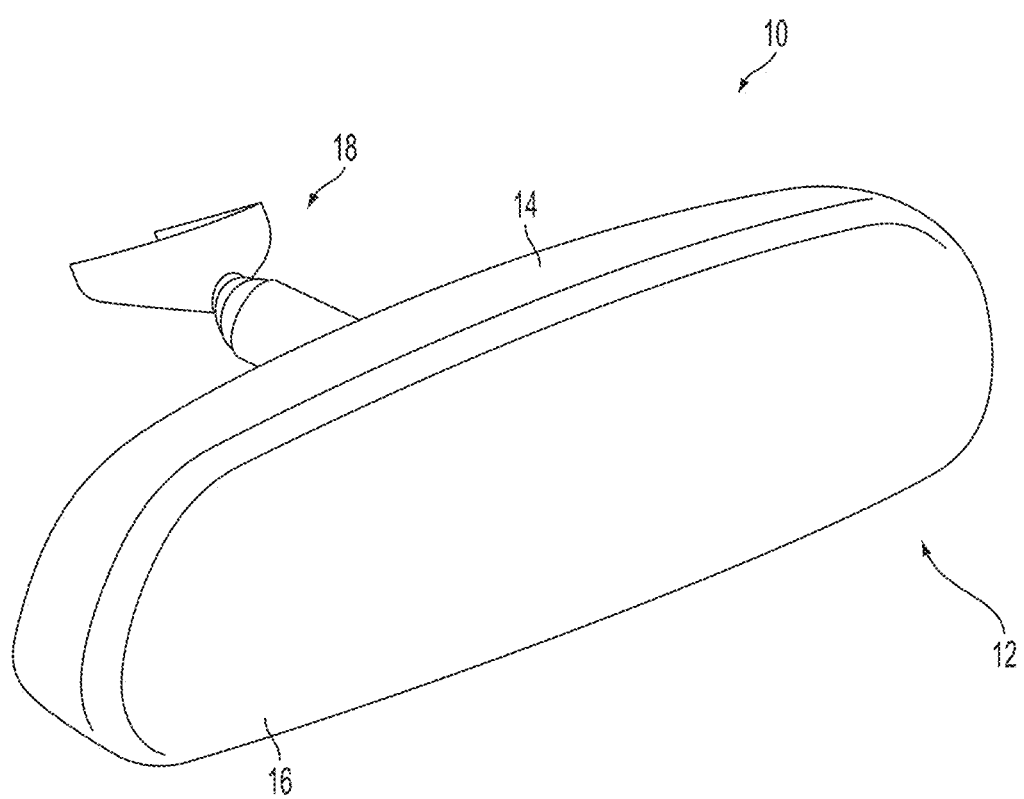
FIG. 1 is a perspective view of an interior rearview mirror assembly.

Referring now to the drawings and the illustrative embodiments depicted therein, an interior rearview mirror assembly 10 for a vehicle includes a mirror head 12 that includes a mirror casing 14 and a mirror reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or base or mounting configuration or assembly 18. The interior rearview mirror assembly 10 may include any suitable construction. For example, the interior rearview mirror assembly 10 may include a variable reflectance electro-optic mirror reflective element 16 or the mirror assembly 10 may include a prismatic reflective element 16. Optionally, the interior rearview mirror assembly may comprise a dual-mode interior rearview video mirror that can switch from a traditional reflection mode to a live-video display mode.

Traffic crash fatalities often involve drunk drivers. To combat this, technologies may be included inside the cabin of the vehicle to prevent drivers from operating vehicles when impaired by alcohol. Traditionally, vehicle alcohol interlocks (i.e., devices that prevent operation of the vehicle when the driver's alcohol levels are above a threshold) include a mouthpiece attached to a breath tube and the driver provides a breath sample via the mouthpiece to have their breath alcohol concentration (BrAC) tested. Thus, traditional systems require the driver to actively and manually provide a breath sample (i.e., samples cannot be collected passively) and the traditional systems require contact of the mouthpiece with the driver's mouth (which can spread germs or otherwise be unsanitary). Furthermore, traditional systems do not verify the identity of the person providing the sample, which may allow an impaired driver to circumvent the system by providing a breath sample from an unimpaired passenger. As described below, the interior rearview mirror assembly 10 is equipped with an alcohol sensing system 20 that may passively collect samples in a non-contact manner and that uses a driver monitoring camera of a driver monitoring system to verify the source of the breath sample.

Figure 2:
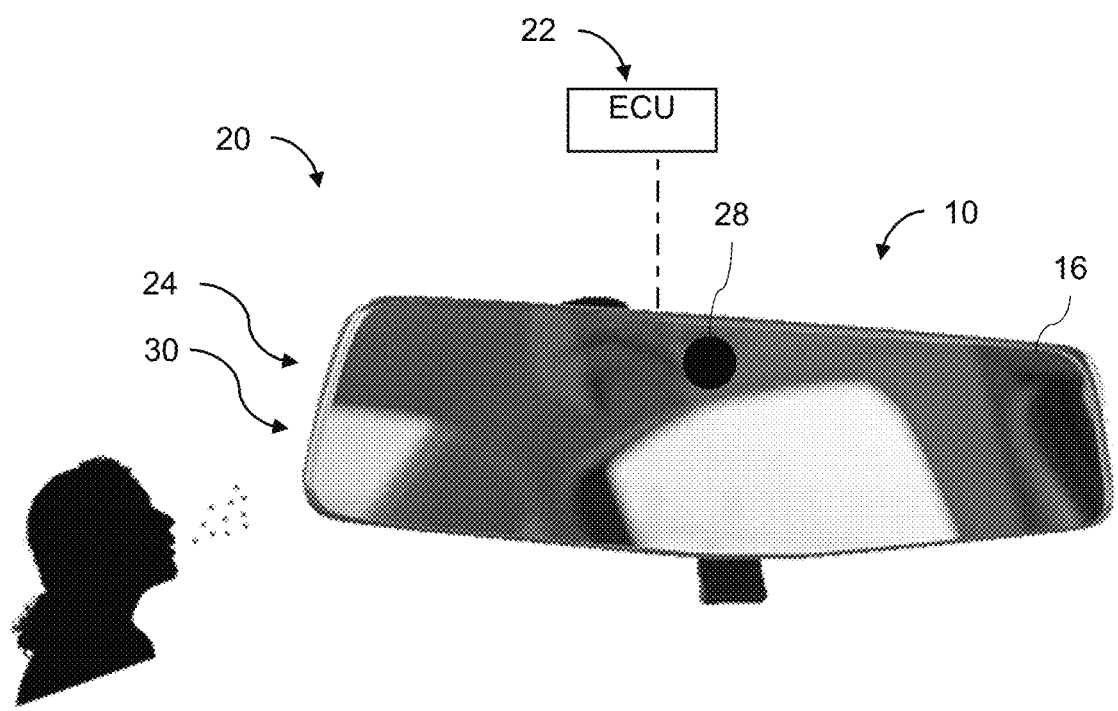
FIG. 2 is a perspective view of an alcohol sensing system incorporated into the interior rearview mirror assembly of a vehicle.

As shown in FIG. 2, the alcohol sensing system 20 includes an electronic control unit (ECU) 22 including electronic circuitry and associated software, where the electronic circuitry includes a data processor configured to process sensor data captured by an alcohol sensing device 24. The ECU 22 may also include an image processor for processing image data captured by a driver monitoring camera 28 of the driver monitoring system. Optionally, the data processor and the image processor may be part of the same or common ECU or may be at separate ECUs. The ECU 22 may be disposed at the mirror assembly 10 (such as accommodated within the mirror head or the mounting structure) or at any suitable position elsewhere at the vehicle and electrically connected or in electrical communication with circuitry of the mirror assembly or mirror head. The ECU 22 is in communication (such as via a communication network of the vehicle, such as a LAN or CAN bus of the vehicle) with an ignition or starting system or other vehicle control so that if, based on processing of sensor data captured by the alcohol sensing device 24, the alcohol sensing system 20 determines that an alcohol content of the driver's breath is above a threshold limit, the system 20 may preclude the driver from operating the vehicle. For example, the system 20 may prevent the ignition from starting the vehicle or the system may prevent the transmission or propulsion system from shifting out of a parking gear.

The alcohol sensing device 24 receives a sample of air from within the interior cabin of the vehicle and the system processes the sample to determine an alcohol content of the sample. The alcohol sensing device 24 may utilize aspects of known breathalyzers or alcohol sensing devices and may determine the alcohol content of a breath sample in a similar manner to known breathalyzers or alcohol sensing devices. As discussed further below, the alcohol sensing system 20 processes sensor data from other sensors disposed at the vehicle (such as driver monitoring cameras) to determine whether the air sample is attributable to the driver of the vehicle and to distinguish a portion of the detected alcohol level attributable to the driver from other environmental factors (such as breath from other passengers or a baseline level of alcohol present in the sample).

As shown in FIG. 2, the alcohol sensing device 24 may be located at the interior rearview mirror assembly 10, which may be mounted at an interior portion of the vehicle, such as at an in-cabin side of the vehicle windshield or such as at a headliner of the vehicle. For example, the alcohol sensing device 24 may be disposed at a driver side of the mirror head and in a position configured to receive the breath sample from the driver. In some implementations, the mirror casing may include one or more ports or passageways or conduits and the alcohol sensing device 24 is disposed within the mirror head and in communication with the passageway to receive the air sample that passes through the one or more ports of the mirror casing. Optionally, the mirror casing may include guide structure (such as a tapered funnel or the like) to direct the air sample toward the alcohol sensing device 24.

Figure 3:
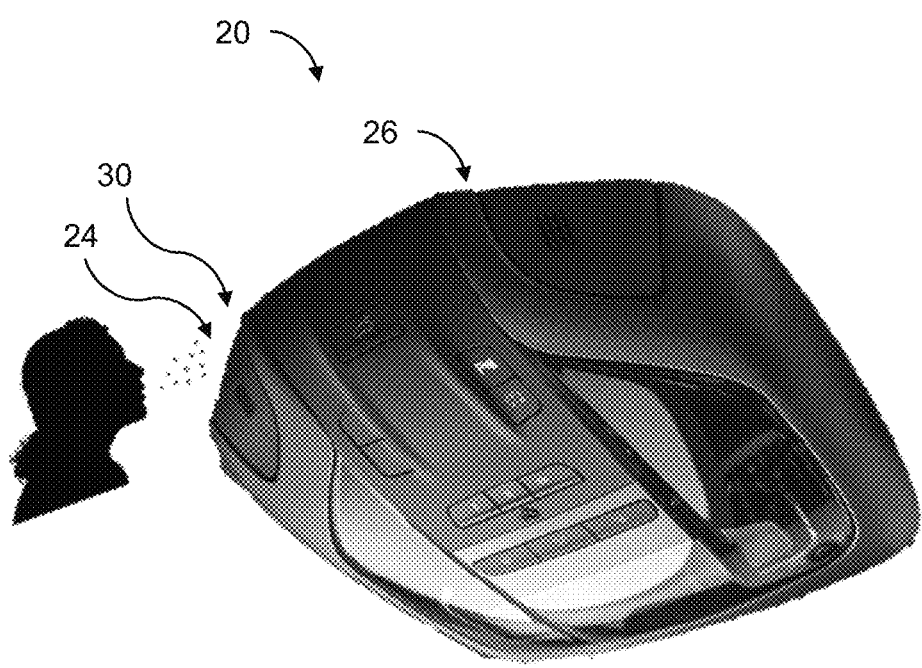
FIG. 3 is a perspective view of the alcohol sensing system incorporated into the overhead console of the vehicle.

As shown in FIG. 3, the alcohol sensing device 24 may be disposed at an overhead console 26 of the vehicle disposed at an upper interior portion of the vehicle, such as a headliner or windshield of the vehicle. The overhead console 26 may include one or more ports or passageways or conduits and/or guide structure to allow the air sample to pass through an outer surface of the overhead console 26 to be received, detected and analyzed by the alcohol sensing device 24.

The alcohol sensing device 24 analyzes air or breath samples received at the alcohol sensing device 24 and, based on processing at the ECU 22, the alcohol detecting system 20 determines the alcohol content of the sample and determines whether the alcohol content of the sample is above a first threshold level (such as, for example, a breath alcohol content indicative of a blood alcohol concentration (BAC) of 0.08 percent or 0.06 percent or the like). When the alcohol content is above the first threshold level, the system 20 precludes the driver from operating the vehicle. For example, the alcohol sensing system 20 may transmit or communicate (such as via a LIN or CAN bus of the vehicle) a signal to an ignition or starter system or vehicle controller to preclude the vehicle from starting or turning on. Optionally, the alcohol sensing system 20 may transmit or communicate a signal to a transmission system or vehicle controller to preclude the vehicle from shifting out of a parking gear.

Conversely, when the alcohol sensing system 20 determines that the alcohol content of the sample is below the first threshold level, the system 20 may allow the driver to operate the vehicle as usual. For example, alcohol sensing system 20 may transmit or communicate signals to the ignition or starter system or vehicle controller and/or the transmission system indicating that the vehicle may be started and/or shifted out of the parking gear. Optionally, the ignition or starter system or vehicle controller and/or the transmission system may not allow the vehicle to be started and/or shifted out of the parking gear until the signal indicative of the alcohol content being below the threshold level is received.

If the alcohol level is below the first threshold level (e.g., indicative of a BAC below the legal limit, such as a BAC of 0.08 percent or lower) but greater than a second threshold level that is less than the first threshold level (such as indicative of a BAC of, for example, 0.06 percent or zero or the like), the system may provide an alert to the driver that the driver has exceeded the lower second threshold level. Optionally, the system may provide notice to the driver of the BAC indicated by the determined alcohol level, such as via a display screen at the mirror reflective element or gauge cluster. Thus, the driver may make an informed decision as to whether they should proceed with operating the vehicle if the determined alcohol level indicates that the driver's BAC may be below, but near, the legal limit.

In some implementations, the system 20 may actively require the driver to provide the sample before the driver may attempt to operate the vehicle. That is, the system 20 may prompt the driver (such as via a visual icon or audio signal) to provide the sample and the system 20 may prevent the driver from operating the vehicle until the sample is provided and it is determined that the alcohol content of the sample is below the required threshold. In such implementations, the system 20 may require the driver to direct (i.e., blow) the air sample toward the alcohol sensing device 24. For example, the driver may blow air toward the passageway formed in the rearview mirror or overhead console from a close proximity.

Optionally, the system 20 may passively monitor air samples from the interior portion of the vehicle. That is, the system 20 does not require the driver to direct air toward the alcohol sensing device 24 and instead captures ambient air from the interior portion of the vehicle. The system 20 may capture ambient samples at any suitable time, such as periodically while the vehicle is being driven, or upon vehicle startup and before the vehicle is shifted from the parking gear to a reverse or drive gear. The system may passively monitor air samples to determine whether the system should prompt the driver to provide an active sample. For example, the system may determine that alcohol is present in a passively captured sample and then require the driver to actively provide the sample to verify whether the alcohol present originated from the driver. Furthermore, the system 20 may determine a base level of alcohol present in the environmental air so that, when an air sample attributable to the breath of the driver is received, the sample may be compared to the base level to provide an accurate measure of the driver's BrAC.

The alcohol sensing device 24 may passively capture the air circulating throughout the interior portion of the vehicle or the sample directed toward the sensing device 24 by the driver, such that the alcohol sensing device is always in communication with the air inside the vehicle. For example, the one or more open ports or conduits or passageways formed at the mirror casing 14 may be in constant communication with the ambient air within the vehicle. Thus, as air circulates throughout the vehicle, the alcohol sensing device 24 may constantly or periodically determine an alcohol content to determine whether the driver may be impaired or not.

Optionally, the alcohol sensing device 24 may actively capture samples from the interior portion of the vehicle. For example, the passageway or port connecting the alcohol sensing device 24 and the interior portion of the vehicle may include a collection device such as a fan or suction device that is operated to direct the sample of air to the alcohol sensing device 24. The collection device may be operated periodically (such as when the system is passively monitoring the alcohol content of the driver) or during a collection period following the prompt for the driver to provide the sample. Optionally, the system may shut down part of the HVAC system of the vehicle (e.g., to shut off the window defogging function) prior to and while taking the air samples to avoid a user from diluting the air sample by activating a blower fan to blow fresh air along the in-cabin side of the windshield and toward the collection device.

The system 20 may process sensor data captured by other sensors within the vehicle to verify the identity of the sample source and/or to ensure that the sample was collected accurately. For example, the driver monitoring camera 28 (FIG. 2) may be disposed at the interior of the vehicle (such as behind the mirror reflective element 16) and the alcohol detecting system 20 may process image data captured by the driver monitoring camera 28 to verify that a sample collected by the alcohol sensing device 24 is from the driver and not, for example, from a passenger. Furthermore, if the system 20 prompts the driver to provide the sample, the system 20 may process the driver monitoring image data to determine whether a protocol is followed during the sample collection process (e.g., that the driver is within a threshold distance of the alcohol sensing device 24 or that the driver blows air toward the alcohol sensing device 24 for a threshold period of time).

Image data captured by the driver monitoring camera 28 may be processed to aid the alcohol detecting system 20 in determining validity of the determination of the driver's alcohol level. For example, the system 20 may determine when the driver has exhaled a breath (such as by measuring the rise and fall of the driver's chest) and begin capturing sensor data using the alcohol sensing device 24 after determining that the driver has exhaled the breath. Similarly, the system 20 may passively monitor the alcohol levels present in the ambient air of the vehicle cabin and, responsive to determining that the driver has exhaled a breath, the system may place greater weight on the detection signals generated immediately subsequent to or within a period of time from the driver's breath in determining whether the alcohol level of the driver is above the threshold level. In other words, the system may monitor the levels of alcohol in the ambient air of the cabin and determine whether the alcohol levels rise based on when the driver exhales. Moreover, the system 20 may use the image data captured by the driver monitoring camera 28 while monitoring the levels of alcohol present in the ambient air to determine a proximity of the driver to the alcohol sensing device 24. The proximity of the driver to the sensing device 24 may be used to weight a determination that the driver's alcohol levels are above the threshold. In other words, if the sensing device 24 determines a level of alcohol present in the ambient air, the proximity or behavior of the driver may be determined to determine a likelihood that the alcohol detection is attributable to the driver or a portion of the alcohol detection that is attributable to the driver. For example, the system may detect a level of alcohol present in the sample and, based on determined proximity of the driver and one or more occupants in the vehicle to the sensing device 24, determine a portion of the alcohol that is attributable to the driver and/or occupants. If one or more occupants are closer to the sensing device 24, the system may attribute a larger portion of the detected alcohol to the occupant.

The system may capture and/or perform analysis of the sample responsive to an input or condition. For example, the system may prompt the driver to provide the sample responsive to the driver entering the vehicle (e.g., the driver monitoring system detects that a person has entered the vehicle and is occupying the driver's seat) or attempting to start the vehicle (e.g., inserting keys into the ignition or actuating a start button of the vehicle). Optionally, the system may determine that the driver is impaired or distracted or driving recklessly (such as based on a driving speed of the vehicle, erratic steering inputs, or a determined gaze of the driver by the driver monitoring system) and begin processing air samples to determine if the driver's impairment is due to raised alcohol levels.

Optionally, the system may begin processing samples based on a condition. For example, the system may only perform analysis on air samples after a time of day (e.g., a driver may be more likely to drive impaired at night) or if the vehicle is located at a certain geographic location (e.g., a driver may be more likely to drive impaired if leaving a bar or restaurant or event venue).

The threshold level of alcohol present may be any suitable number (such as a threshold BrAC indicative of 0.08 percent BAC or 0.06 percent or the like (or other level below the legal BAC limit). The threshold alcohol level may be determined or adjusted. For example, the alcohol sensing system 20 may communicate with a geographic positioning system of the vehicle to determine a geographic location of the vehicle. Because the legal limit for alcohol may vary by locality, the system may determine the threshold level based on a known legal limit for the position of the vehicle. Optionally, the system 20 may identify the driver based on a stored driver profile and determine the threshold level based on the stored driver profile. For example, the stored driver profile may identify the driver as under the legal drinking age and thus the threshold level may be set to zero to prevent the underage driver from driving if any alcohol is detected.

In response to determining that the alcohol of the driver's breath is above the threshold limit, and in addition to preventing the driver from operating the vehicle, the system may illuminate an icon (such as an icon at the interior rearview mirror reflective element or a gauge cluster or infotainment screen of the vehicle) to alert the driver as to their level of impairment. For example, the system may utilize characteristics of the systems described in U.S. Pat. Pub. No. US-2012-0236136, which is hereby incorporated herein by reference in its entirety.

As shown in FIGS. 2 and 3, the alcohol detection system 20 may further include a carbon dioxide ($CO_2$) sensing device 30, which may be integrated with the alcohol sensing device 24 or may be a remote and separate sensor from the alcohol sensing device 24. For example, the CO2 sensing device 30 may be disposed at the mirror assembly 10 and configured to receive a portion of the air sample directed to the alcohol sensing device 24. Based on processing of sensor data captured by the CO2 sensing device 30, the system 12 determines a concentration of CO2 present in the air sample. The CO2 sensing device 30 may utilize characteristics of the sensing devices described in U.S. provisional patent application Ser. No. 63/369,431, filed Jul. 26, 2022, which is hereby incorporated herein by reference in its entirety.

Because exhaled breath has a relatively high CO2 concentration, determination of a high CO2 concentration in the air sample can verify that the air sample is representative of the driver's breath. That is, a high CO2 concentration may indicate that the air sample is highly likely to be representative of the driver or a vehicle occupant's breath while a low CO2 concentration may indicate that the air sample is less likely to be representative of breath. Thus, use of the alcohol sensing device 24 to determine levels of alcohol present in the air and use of the CO2 sensing device 30 to determine levels of CO2 present in the air can reduce false determinations and improves validation of air samples attributable to the breath of the driver. Further, the CO2 sensing device 30 makes manipulation of the system, such as by directing air toward the sensing devices from another source (like an HVAC vent), more difficult because manipulation is unlikely to direct air toward the sensing device that has a high concentration of CO2 and manipulation is more likely to direct air toward the sensing device that dilutes the concentration of CO2 or has a low concentration of CO2. The system thus may detect an alcohol level in an air sample, but may only consider the air sample as a valid air sample (i.e., representative of the driver's breath) if the CO2 sensor senses at least a threshold level of CO2 in an air sample at that time.

Thus, the alcohol detection system 20 provides a contact-free ethanol breath analyzer within the interior rearview mirror and/or overhead console of the vehicle. The interior rearview mirror and/or overhead console are ergonomic and convenient positions for the vehicle operator to use (and it should be understood that other positions are possible, such as the dashboard of the vehicle). The system replaces manual interlocks with a sensor farm, which enables passive/contactless detection of a vehicle operator's impairment state. The system may passively monitor the ethanol levels on human breath samples and, based on all sensor inputs (e.g., from driver or occupant monitoring systems), the system distinguishes the ethanol concentration of human breath from the cabin air. The system allows the size and complexity of alcohol interlocks to be reduced and provides a fast reacting, accurate, reliable, contact free breath analysis technology.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or International PCT Application No. PCT/US2023/021799, filed May 11, 2023 and published Nov. 16, 2023 and International Publication No. WO 2023/220222, which are all hereby incorporated herein by reference in their entireties.

The ECU may receive image data captured by one or more driver monitoring system (DMS) cameras. The ECU may comprise a central or single ECU that processes image data captured by the cameras for a plurality of driving assist functions. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or International Application No. PCT/US2022/070062, filed Jan. 6, 2022, which are all hereby incorporated herein by reference in their entireties.

The mirror reflective element may include an electro-optic mirror reflective element utilizing characteristics of the interior rearview mirror assemblies described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407; 5,066,112; 6,449,082 and/or 4,712,879, which are hereby incorporated herein by reference in their entireties.

The interior mirror assembly may include a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Optionally, the alcohol sensing system may process sensor data and determine the driver's alcohol level responsive to a user input. For example, the driver may press a button at the rearview mirror assembly to begin capturing sensor data. Thus, the mirror assembly may include user actuatable inputs. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,451; 6,504,531; 6,501,465; 6,492,980; 6,452,479; 6,437,258 and/or 6,369,804, which are hereby incorporated herein by reference in their entireties, and/or the like.

Changes and modifications in the specifically described embodiments may be carried out without departing from the principles of the present invention, which is intended to be limited only by the scope of the appended claims as interpreted according to the principles of patent law.

The invention claimed is:

1. A vehicular alcohol sensing system, the vehicular alcohol sensing system comprising:
   an air sensing device disposed at a vehicular component, wherein the vehicular component is disposed at an interior portion of a vehicle equipped with the vehicular alcohol sensing system;
   wherein the air sensing device captures sensor data representative of a sample of air at the vehicular component;
   a driver monitoring camera disposed in the vehicle and capturing image data representative of at least a head region of a driver of the vehicle;
   an electronic control unit (ECU) comprising electronic circuitry and associated software, wherein the electronic circuitry comprises (i) a data processor configured to process sensor data captured by the air sensing device, and (ii) an image processor configured to process image data captured by the driver monitoring camera;
   wherein the vehicular alcohol sensing system, based on processing at the ECU of sensor data captured by the air sensing device and based on processing at the ECU of image data captured by the driver monitoring camera, determines an alcohol level of the driver's breath;
   wherein the vehicular alcohol sensing system, responsive to determining that the alcohol level of the driver's breath is above a threshold alcohol level, prevents operation of the vehicle; and
   wherein a current geographic location of the vehicle is determined, and wherein the vehicular alcohol system adjusts the threshold alcohol level based on the determined current geographic location of the vehicle.

2. The vehicular alcohol sensing system of claim 1, wherein the vehicular component comprises an interior rearview mirror assembly of the vehicle.

3. The vehicular alcohol sensing system of claim 2, wherein the driver monitoring camera is disposed at the interior rearview mirror assembly and views through a mirror reflective element of the interior rearview mirror assembly.

4. The vehicular alcohol sensing system of claim 2, wherein the sample of air is received by the air sensing device through a port disposed at a mirror casing of the interior rearview mirror assembly.

5. The vehicular alcohol sensing system of claim 1, wherein the vehicular component comprises an overhead console module of the vehicle.

6. The vehicular alcohol sensing system of claim 1, wherein the vehicular alcohol sensing system, based on processing at the ECU of image data captured by the driver monitoring camera, determines that the sample of air is at least partially representative of the driver's breath.

7. The vehicular alcohol sensing system of claim 1, wherein the vehicular alcohol sensing system prompts the driver to direct breath toward the air sensing device, and wherein the air sensing device captures the sample of air while the driver directs breath toward the air sensing device.

8. The vehicular alcohol sensing system of claim 7, wherein the vehicular alcohol sensing system, after prompting the driver and based on processing at the ECU of image data captured by the driver monitoring camera, verifies that the sample of air is from the driver.

9. The vehicular alcohol sensing system of claim 1, wherein the vehicular alcohol sensing system, based on processing at the ECU of sensor data captured by the air sensing device, determines a level of alcohol present in the sample of air at the vehicular component, and wherein the vehicular alcohol sensing system, based on processing at the ECU of image data captured by the driver monitoring camera, determines a portion of the level of alcohol attributable to the driver's breath to determine the alcohol level of the driver's breath.

10. The vehicular alcohol sensing system of claim 1, wherein the vehicular alcohol sensing system, based on processing at the ECU of image data captured by the driver monitoring camera, determines an identity of the driver, and wherein the vehicular alcohol sensing system adjusts the threshold alcohol level based on the determined identity of the driver.

11. The vehicular alcohol sensing system of claim 10, wherein the vehicular alcohol sensing system adjusts the threshold alcohol level to be equal to zero based on the determined identity of the driver.

12. The vehicular alcohol sensing system of claim 1, wherein the vehicular alcohol sensing system prevents operation of the vehicle by disabling at least one selected from the group consisting of (i) an ignition of the vehicle and (ii) a propulsion system of the vehicle.

13. The vehicular alcohol sensing system of claim 1, wherein the threshold alcohol level is a breath alcohol concentration indicative of a blood alcohol content of 0.08 percent.

14. The vehicular alcohol sensing system of claim 1, further comprising a carbon dioxide sensing device (CO2 sensing device), wherein the CO2 sensing device captures sensor data representative of a level of carbon dioxide (CO2) present in the sample of air.

15. The vehicular alcohol sensing system of claim 14, wherein the vehicular alcohol sensing system, based on processing at the ECU of sensor data captured by the CO2 sensing device, determines that the sample of air is representative of the driver's breath.

16. The vehicular alcohol sensing system of claim 14, wherein the air sensing device comprises the CO2 sensing device.

17. A vehicular alcohol sensing system, the vehicular alcohol sensing system comprising:
- an air sensing device disposed at a vehicular component, wherein the vehicular component is disposed at an interior portion of a vehicle equipped with the vehicular alcohol sensing system;
- wherein the air sensing device captures sensor data representative of a sample of air at the vehicular component;
- a driver monitoring camera disposed in the vehicle and capturing image data representative of at least a head region of a driver of the vehicle;
- an electronic control unit (ECU) comprising electronic circuitry and associated software, wherein the electronic circuitry comprises (i) a data processor configured to process sensor data captured by the air sensing device, and (iI) an image processor configured to process image data captured by the driver monitoring camera;
- wherein the vehicular alcohol sensing system prompts the driver to direct breath toward the air sensing device, and wherein the air sensing device captures the sample of air while the driver directs breath toward the air sensing device;
- wherein the vehicular alcohol sensing system, based on processing at the ECU of image data captured by the driver monitoring camera, determines an identity of the driver;
- wherein the vehicular alcohol sensing system, based on processing at the ECU of sensor data captured by the air sensing device and based on processing at the ECU of image data captured by the driver monitoring camera, determines an alcohol level of the driver's breath;
- wherein the vehicular alcohol sensing system, responsive to determining that the alcohol level of the driver's breath is above a threshold alcohol level, prevents operation of the vehicle;
- wherein the vehicular alcohol sensing system adjusts the threshold alcohol level based on the determined identity of the driver; and
- wherein a current geographic location of the vehicle is determined, and wherein the vehicular alcohol system adjusts the threshold alcohol level based on the determined current geographic location of the vehicle.

18. The vehicular alcohol sensing system of claim 17, wherein the vehicular component comprises an interior rearview mirror assembly of the vehicle.

19. The vehicular alcohol sensing system of claim 18, wherein the sample of air is received by the air sensing device through a port disposed at a mirror casing of the interior rearview mirror assembly.

20. The vehicular alcohol sensing system of claim 17, wherein the vehicular component comprises an overhead console module of the vehicle.

21. The vehicular alcohol sensing system of claim 17, wherein the vehicular alcohol sensing system, based on processing at the ECU of sensor data captured by the air sensing device, determines a level of alcohol present in the sample of air at the vehicular component, and wherein the vehicular alcohol sensing system, based on processing at the ECU of image data captured by the driver monitoring camera, determines a portion of the level of alcohol attributable to the driver's breath to determine the alcohol level of the driver's breath.

22. The vehicular alcohol sensing system of claim 17, wherein the vehicular alcohol sensing system prevents operation of the vehicle by disabling at least one selected from the group consisting of (i) an ignition of the vehicle and (ii) a propulsion system of the vehicle.

23. A vehicular alcohol sensing system, the vehicular alcohol sensing system comprising:
- an air sensing device disposed at an interior rearview mirror assembly of a vehicle equipped with the vehicular alcohol sensing system, wherein the interior rearview mirror assembly is disposed at an interior portion of the vehicle;
- wherein the air sensing device captures sensor data representative of a sample of air at the interior rearview mirror assembly;
- a driver monitoring camera disposed at the interior rearview mirror assembly and capturing image data representative of at least a head region of a driver of the vehicle;
- an electronic control unit (ECU) comprising electronic circuitry and associated software, wherein the electronic circuitry comprises (i) a data processor configured to process sensor data captured by the air sensing device, and (iI) an image processor configured to process image data captured by the driver monitoring camera;
- wherein the vehicular alcohol sensing system, based on processing at the ECU of image data captured by the driver monitoring camera, determines that the sample of air is at least partially representative of the driver's breath;
- wherein the vehicular alcohol sensing system, based on processing at the ECU of sensor data captured by the air sensing device and based on processing at the ECU of image data captured by the driver monitoring camera, determines an alcohol level of the driver's breath;
- wherein the vehicular alcohol sensing system, responsive to determining that the alcohol level of the driver's breath is above a threshold alcohol level, prevents operation of the vehicle;
- wherein the vehicular alcohol sensing system prevents operation of the vehicle by disabling at least one selected from the group consisting of (i) an ignition of the vehicle and (ii) a propulsion system of the vehicle; and
- wherein a current geographic location of the vehicle is determined, and wherein the vehicular alcohol sensing system adjusts the threshold alcohol level based on the determined current geographic location of the vehicle.

24. The vehicular alcohol sensing system of claim 23, wherein the vehicular alcohol sensing system, based on processing at the ECU of sensor data captured by the air sensing device, determines a level of alcohol present in the sample of air at the interior rearview mirror assembly, and wherein the vehicular alcohol sensing system, based on processing at the ECU of image data captured by the driver monitoring camera, determines a portion of the level of alcohol attributable to the driver's breath to determine the alcohol level of the driver's breath.

25. The vehicular alcohol sensing system of claim 23, wherein the vehicular alcohol sensing system, based on processing at the ECU of image data captured by the driver monitoring camera, determines an identity of the driver, and wherein the vehicular alcohol sensing system adjusts the threshold alcohol level based on the determined identity of the driver.

26. The vehicular alcohol sensing system of claim 23, wherein the sample of air is received by the air sensing device through a port disposed at a mirror casing of the interior rearview mirror assembly.

* * * * *

UNITED STATES PATENT AND TRADEMARK OFFICE
CERTIFICATE OF CORRECTION

| | | |
|---|---|---|
| PATENT NO. | : 12,447,820 B2 | Page 1 of 1 |
| APPLICATION NO. | : 18/353165 | |
| DATED | : October 21, 2025 | |
| INVENTOR(S) | : Sethuraman Ravichandran et al. | |

It is certified that error appears in the above-identified patent and that said Letters Patent is hereby corrected as shown below:

In the Claims

<u>Column 11</u>
Claim 17, Line 30, "and (il)" should be --and (ii)--

<u>Column 12</u>
Claim 23, Line 34, "and (il)" should be --and (ii)--

Signed and Sealed this
Eighteenth Day of November, 2025

John A. Squires
*Director of the United States Patent and Trademark Office*